(12) United States Patent
Hall

(10) Patent No.: US 6,355,170 B1
(45) Date of Patent: Mar. 12, 2002

(54) DUAL MANIFOLD FILTERING SYSTEM

(76) Inventor: Barry H. Hall, 222 E. Foothill Blvd., Monrovia, CA (US) 91016

( * ) Notice: Subject to any disclaimer, the term of this patent is extended or adjusted under 35 U.S.C. 154(b) by 0 days.

(21) Appl. No.: 09/505,071

(22) Filed: Feb. 16, 2000

(51) Int. Cl.$^7$ .......................... B01D 25/00; B01D 29/52; B01D 29/60

(52) U.S. Cl. .................... 210/323.1; 210/340; 210/341; 210/343; 210/345; 210/433.1; 210/435; 210/499

(58) Field of Search .......................... 210/323.1, 323.2, 210/322, 340, 341, 416.1, 418, 424–425, 433.1, 435, 253, 407, 409, 411, 457, 456, 499, 190–191, 193, 196, 333.01, 334, 343, 345, 427; 137/599.14, 599.15

(56) References Cited

U.S. PATENT DOCUMENTS

| | | | | |
|---|---|---|---|---|
| 585,497 A | * | 6/1897 | Aufrichtig | |
| 967,776 A | * | 8/1910 | Huber | |
| 2,981,416 A | * | 4/1961 | Lawlor | |
| 3,069,014 A | | 12/1962 | Lewis | 210/169 |
| 3,187,899 A | | 6/1965 | Prizler | 210/487 |
| 3,195,726 A | * | 7/1965 | Saurenman et al. | |
| 3,380,591 A | | 4/1968 | Muller | 210/143 |
| 3,608,725 A | | 9/1971 | Oden | 210/169 |
| 3,653,513 A | | 4/1972 | Ortega et al. | 210/169 |
| 3,721,268 A | * | 3/1973 | Erlich et al. | |
| 3,774,772 A | * | 11/1973 | Yeths | 210/456 |
| 3,969,248 A | | 7/1976 | Whitmer | 210/126 |
| 4,105,555 A | * | 8/1978 | Pease | |
| 4,328,833 A | * | 5/1982 | Aurther | |
| 4,622,137 A | * | 11/1986 | Kessler | 210/169 |
| 4,836,936 A | | 6/1989 | Schewitz | 210/791 |
| 4,966,718 A | | 10/1990 | Johnson | 210/776 |
| 5,611,924 A | | 3/1997 | Osborne | 210/323.2 |
| 5,635,066 A | | 6/1997 | Maurer | 210/411 |
| 5,772,872 A | | 6/1998 | Shelhamer | 210/169 |
| D405,157 S | | 2/1999 | Hayes et al. | D23/209 |

FOREIGN PATENT DOCUMENTS

WO   WO 96/02311   7/1995   .......... B01D/21/29

OTHER PUBLICATIONS

Perry, R.H., Pumping of Liquids and Gases, Perry's Chemical Engineers' Handbook, 5$^{th}$ ed. 1973, pp. 6–5–6–14.

* cited by examiner

Primary Examiner—Matthew O. Savage
Assistant Examiner—Marianne S. Ocampo
(74) Attorney, Agent, or Firm—McCutchen, Doyle, Brown & Enersen, LLP

(57) ABSTRACT

In accordance with the present invention there is provided a dual manifold filtering system. The dual manifold filtering system of the present invention, unlike the currently available filtering systems, allows the filter elements to be cleaned from both ends of the filter elements during backwashing operations. A flow restriction device is also placed in the grid main channel of the filter elements to force more of the liquid to flow out radially from the grid main channel during backwashing. Valve and piping means are provided to enable liquid to be directed into one or the other manifold during backwashing operations.

9 Claims, 2 Drawing Sheets

DUAL MANIFOLD FILTERING SYSTEM

FIELD OF THE INVENTION

This invention relates to a filtering system by which liquids may be clarified by separating constituents suspended in the liquids from a filtrate. More particularly, this invention relates to a dual manifold filtering system by which a liquid may be cleansed of suspended particles by passing the liquid, under a pressure differential, through a plurality of fabric covered filter elements, each of which is coated with a pulverulent, such as diatomaceous earth, which transmits the liquid and captures the particles. The two manifolds of the filtering systems, located at either end of the filter elements, allow the filter elements to be thoroughly cleansed of the captured particles, during backwashing operations, from both ends of the filter elements.

BACKGROUND OF THE INVENTION

Filtering systems for filtering fluids, such as water for use in a swimming pool or the like, are well-known and include those types in which multiple filter elements that can be coated with a special pulverulent material, such as diatomaceous earth (DAE), are provided in a filter tank or other vessel. A pressure differential in the fluid being filtered is maintained at opposite sides of each filtering element. Valving means are also conventionally provided with such systems, which allow the fluid flow through the filters to be reversed.

The filter elements may take many forms. For example, they may be in the form of porous or finely perforated, vertically aligned, curved or flat rectangular plates or cylindrical tubes. The plates comprise one or more hollow, rectangular inner support elements, which are perforated in a grid-like pattern. The elements are radially equidistantly disposed about an axis parallel to the longitudinal axis of the filter tank, and have one or more support ribs. The inner support element is encased within an outer, fine mesh cloth (made of polyester or other material) which passes water but retains the DAE particles. Similarly, the tubes may comprise one or more layers of fine mesh wire screen mounted on rigid supports such as wire frames.

Existing DAE filtering systems are single manifold systems. Thus, in current practice the multiple filter elements are in an integral relationship with a single manifold structure, located at one end of the filter tank, that collects the filtered water for downstream delivery, for example, into a swimming pool. In the operation of such filter elements, fluid containing a fine powder in suspension, generally a DAE, is forced through the porous filter elements (plates or tubes) and the powder accumulates on the surface of the elements so as to reduce the size of the interstices or perforations on the element wall and thus enhance the filtering operation and ensure the removal from the fluid of particles suspended therein. In operation, when the filtering cycle is stopped, the accumulated DAE layer falls off the outer surface of the elements. However, it has been found that accumulated DAE particles tend not to fall off at the corners and sides of such outer surfaces. Thus, often the DAE powder or the like accumulates and builds up on and in the spaces between the filter elements. Therefore, it is necessary periodically to remove accumulated powders from the filter plates or tubes to prevent clogging thereof.

The removal of the accumulated layer of powder or "sludge", is usually effected by a so called backwash operation wherein liquid is forced from the manifold through the filter elements (plates or tubes) in a direction opposite to that in which the liquid flowed during the filtering operation. In the existing single manifold systems, it has been extremely difficult and sometimes impossible, to completely remove the accumulated layer of powder and sludge from the filter elements, and too often the sludge builds up or "bridges", in the spaces between the filter elements, which seriously interferes with the removal of sludge from the filter.

Once a filter system is installed it has been found that substantially one hundred percent of the maintenance is in the cleaning of the filter of the dirt and sludge that it collects. Therefore, efficient backwashing is the key to cost-effective operation and maintenance of filter systems. Because the backwashing operation in existing filter systems, which are single manifold systems, suffers from poor efficacy, there is a need for an improved filter system.

The present invention provides an ingenious solution to the problem of poor backwashing. It does so based on the recognition that the "bridging", normally takes place at that end of the filter elements that is opposite to the manifold. Therefore, the problem of poor backwashing lies in the fact that a single manifold design can only effectuate adequate backwashing in that half of the element that is closest to the manifold.

SUMMARY OF THE INVENTION

In accordance with the present invention, there is provided a dual manifold filter system comprising a plurality of filter elements, each of said filter elements having a first end and a second end, a first structure which includes a first manifold, said first manifold having a connecting end that allows liquid to flow in or out of the first manifold, and an element connecting end with means to couple the first end of each of the filter elements to the first manifold and a second structure which includes a second manifold, said second manifold also having a connecting end that allows liquid to flow in or out of the second manifold, and an element connecting end with means to couple the second end of each of said filter elements to said second manifold. Such a dual manifold system allows the liquid to flow into the filter elements from either end during the backwashing cycle.

In another embodiment of the present invention, the filter system is comprised of walls defining a closed chamber having a first end, a second end and sides, inlet hydraulic conduit means at the first end of said chamber for admitting liquid to be filtered, a plurality of filter elements within said chamber, each of said filter elements having a first rod-shaped end and a second rod-shaped end projecting from said filter element, a first structure which includes a first manifold near the first end of the chamber, said first manifold having a chamber connecting end that allows liquid to flow in or out of the first manifold, and an element connecting end with means to couple the first rod-shaped end of each of the filter elements to the first manifold, a second structure which includes a second manifold near the second end of said chamber, said second manifold having a chamber connecting end that allows liquid to flow in or out of the second manifold, and an element connecting end with means to couple the second rod-shaped end of each of said filter elements to said second manifold, a first hydraulic means having a first end coupled to the chamber connecting end of the first manifold for conducting liquid to and from the first manifold, and a second end connected to the chamber and extending externally therethrough, a second hydraulic means having a first end coupled to the chamber connecting end of the second manifold for conducting liquid to and from the second manifold, and a second end connected to the chamber and extending externally therethrough, and means carried by said chamber wall for supporting the unit of filter elements. The supporting means for supporting the unit of filter elements may be co-acting with the first and second hydraulic conduit means to maintain the filter elements in a fixed predetermined relation within the chamber and permit ready removal of the elements from the chamber as a unit. The supporting means may also be in the form of a through-bolt that goes from the top to the bottom of the chamber through the manifolds.

The filter elements of the filter system may be comprised of a support frame, and a flexible outer sleeve encasing the support frame, said outer sleeve formed of a material having a multiplicity of interstices therein which pass fluid therethrough but are small enough to prevent diatomaceous earth particles from passing through, said outer sleeve being tightly wrapped over, and sealed at both ends to said support frame providing a rigid unitary structure therewith, said outer sleeve being open at the first rod-shaped end and the second rod-shaped end and adapted at said first and second rodlike ends to couple to the channel connecting ends of the first and second manifolds, respectively.

The filter elements of the filter system may be such that the material that forms the outer sleeve of the filter elements is braided or woven synthetic plastic fiber. Similarly, the support frame of the filter elements may be comprised of a moldable plastic material selected from the group consisting of polyethylene, polypropylene, polysulfone, polycarbonate, and acrylonitrile-butadience-styrene. The filter elements may take various shapes and could, for example, be cuboid shaped, cylindrically shaped, or shaped in the form of flat or curved rectangular plates.

Further, the filter system may be such that the first manifold includes a cylindrical hub to which the first rodlike end of each of the filter elements can be connected and the second manifold includes a cylindrical hub to which the second rod-shaped end of each of the filter elements can be connected.

In addition the first and second hydraulic means for connecting the first and second manifolds, respectively, to the chamber comprise conduit arms open at both ends.

In another embodiment of the invention, a flow control device is located in the liquid flowpath between the first and the second ends of the plurality of filter elements such that the flow of liquid during the backwash cycle is restricted in the axial direction and is enhanced in the radial direction. In a preferred embodiment, the flow control device is a restriction orifice.

In a preferred embodiment, the present invention takes the form of a filter system for filtering a liquid comprising (a) a tank having a fixed body and a removable cover, said body having an inlet port, a first manifold port and a second manifold connecting port; (b) a removable filter assembly disposed within said tank, said filter assembly comprised of a first manifold, a second manifold, and a plurality of like, curved filter elements, each of said filter elements being comprised of a backbone grid main channel open at a first end and a second end, ribs attached to said backbone grid main channel and extending outwardly therefrom to form a substantially rigid skeletal grid, a woven septum stretched over the entire surface of the skeletal grid, said backbone grid main channel extending substantially through the length of the woven septum with its first and second ends projecting therethrough, and said ribs and the backbone grid main channel connected together in such a way that the filtered liquid flows from the direction of the ribs into the backbone grid main channel and out through one of either the first or the second end of the backbone channel, said first manifold including a central hub having a plurality of element connecting ends extending outwards from the central hub and with means to couple the first end of the backbone grid main channel of each of the filter elements to the first manifold, and a conduit arm in fluid communication with the first manifold port in said body, said second manifold including a central hub having a plurality of element connecting ends extending outwards from the central hub and with means to couple the second end of the backbone grid main channel of each of the filter elements to the second manifold, and a conduit arm in fluid communication with the second manifold port in said body, said filter assembly being disposed in a flow path of the liquid passing into and out of said tank; (c) a pump means in fluid communication with an inlet line for the liquid to be filtered, with said ports in said tank, and with return and waste lines, said pump means being capable of causing said liquid to flow into and out of said ports in said tank, through said filter elements, and the first and second manifolds and out through said return or waste lines and further being capable of causing said liquid to by-pass said tank and flow out of said return or waste lines; and (d) a multifunctional valve means in fluid communication with said pump means, with said ports in said tank, and with said return and waste lines and having: a first control means having open and closed states and capable of controlling the flow of said liquid into said inlet port through said filter elements and said first manifold and said first manifold port, and out through said return line; a second control means having open and closed states and capable of controlling the flow of said liquid into said first manifold port, through said first manifold and filter elements and through said inlet port, and out through said waste line; a third control means having open and closed states and capable of controlling the flow of said liquid into said second manifold port, through said second manifold and filter elements and through said inlet port, and out through said waste line; a fourth control means having open and a closed states and capable of controlling the flow of said liquid by-passing said tank out of said return line; a fifth control means having open and closed states and capable of controlling the flow of said liquid by-passing said tank out of said waste line; and means for moving each of said first, second, third, fourth and fifth control means between their respective open and closed states.

In another form of the above embodiment, the backbone grid main channel may contain a flow control device, which preferably is a restriction orifice. Further, the backbone grid main channel may be in the form of a conduit, or may even be comprised of more than one conduit.

In another preferred embodiment, the present invention takes the form of a filter system for filtering a liquid comprising (a) a tank having a fixed body and a removable cover, said body having an inlet port, a first manifold port and a second manifold connecting port; (b) a removable filter assembly disposed within said tank, said filter assembly comprised of a first manifold, a second manifold, and a plurality of like, curved filter elements, each of said filter elements being comprised of a backbone grid main channel open at a first end and a second end, ribs attached to said backbone grid main channel and extending outwardly therefrom to form a substantially rigid skeletal grid, a woven septum stretched over the entire surface of the skeletal grid, said backbone grid main channel extending substantially through the length of the woven septum with its first and second ends projecting therethrough, and said ribs and the backbone grid main channel connected together in such a way that the filtered liquid flows from the direction of the ribs into the backbone grid main channel and out through one of either the first or the second end of the backbone channel, said first manifold including a central hub having a plurality of element connecting ends extending outwards from the central hub and with means to couple the first end of the backbone grid main channel of each of the filter elements to the first manifold, and a conduit arm in fluid communication with the first manifold port in said body, said second manifold including a central hub having a plurality of element connecting ends extending outwards from the central hub and with means to couple the second end of the backbone grid main channel of each of the filter elements to the second manifold, and a conduit arm in fluid communication with the second manifold port in said body, said filter assembly being disposed in a flow path of the liquid passing into and out of said tank; (d) an inlet conduit for the liquid to be filtered; (e) a filtered liquid return conduit; (f) a backwash waste conduit; (g) a pump means in fluid communication with the inlet conduit for the liquid to be filtered, with said inlet port and manifold ports in said tank, and with the filtered liquid return conduit and the backwash waste conduit, said pump means being capable of causing said liquid to flow into and out of said inlet and manifold ports in said tank, through said filter elements, and the first and second manifolds and out through said filtered liquid return conduit and the backwash waste conduit; and (h) a valve and pipe means in fluid communication with said pump means, with said inlet port and manifold ports in said tank, and having: (i) a two-position slide valve that can be slid into a filter position or a backwash position, a first port of said slide valve being connected to the inlet conduit for the liquid to be filtered, a second port of said slide valve being connected to the filtered liquid return conduit, and a third port of said slide valve being connected to the backwash waste conduit; (ii) a first conduit connecting a fourth port of said slide valve to the inlet port of the tank; (iii) a three-way valve; (iv) a second conduit connecting the first manifold port of the tank to a first port of the three-way valve; (v) a third conduit connecting the second manifold port of the tank to a second port of the three-way valve; and (vi) a fourth conduit connecting a third port of the three way valve to a fifth port of said slide valve.

In another form of the above embodiment, the backbone grid main channel may contain a flow control device, which preferably is a restriction orifice. Further, the backbone grid main channel may be in the form of a conduit, or may even be comprised of more than one conduit.

DETAILED DESCRIPTION OF THE PREFERRED EMBODIMENTS

Figure 1:
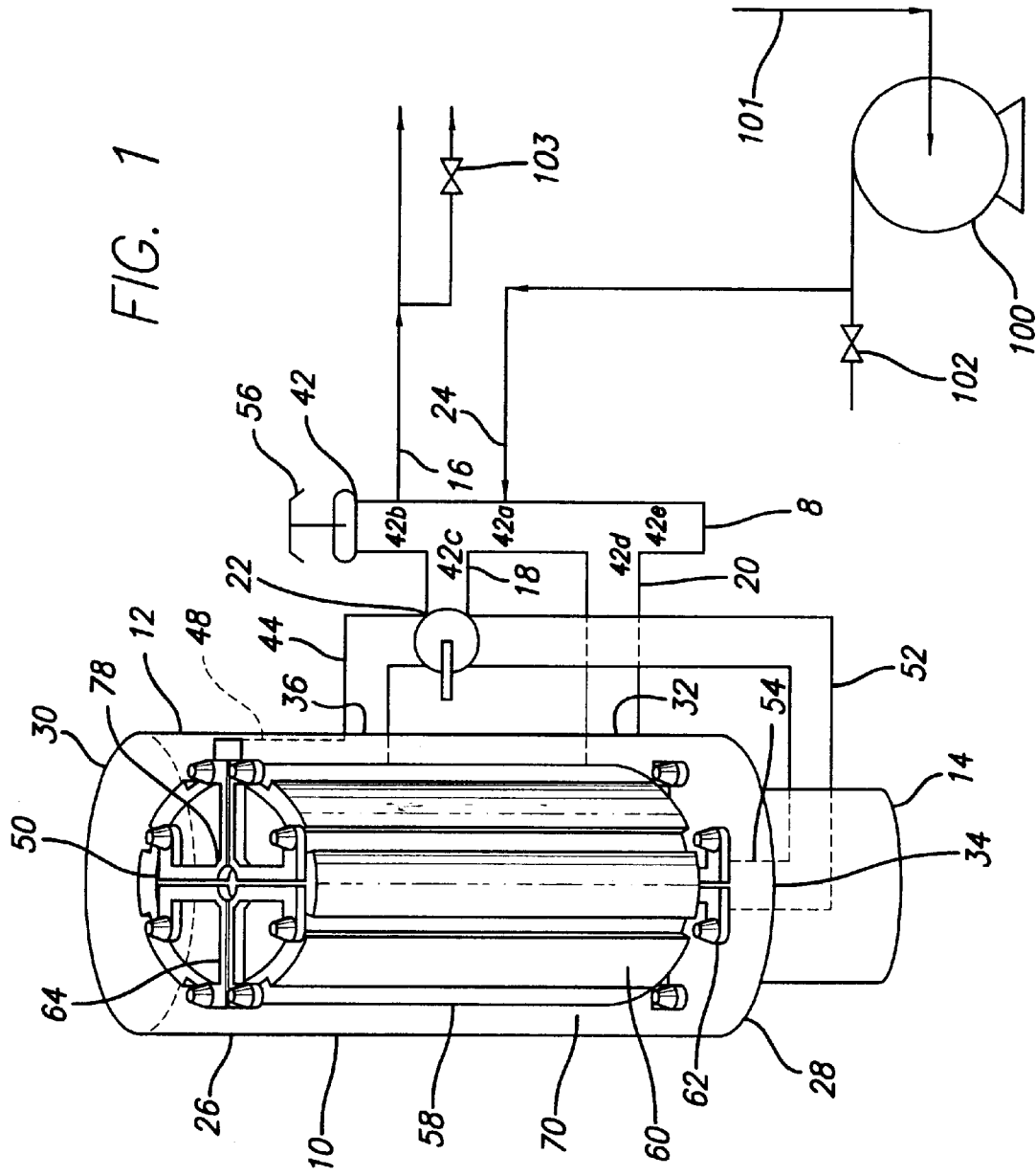
FIG. 1 shows a dual manifold filter system along with the associated piping and valving arrangement.

For purposes of illustration, the filtering system of the present invention will be described in connection with a swimming pool system in which the filtering system filters the pool water. Referring to FIG. 1, the reference numeral 10 refers in general to the filtering system of the present invention which comprises a tank or container 12 which is generally cylindrically shaped, shown mounted on a generally cylindrically shaped pedestal on support base 14 which in turn is formed integral with a skid (not shown). Also secured on the skid are a pump (100) and motor (not shown). The pump is driven by the motor to pump water in through an inlet, formed on the pump housing, and out through an outlet, also formed on the pump housing, to the tank 12. The piping connections between the pump 100, the filtering system 10 and the pool are only shown schematically in FIG. 1. Typically, as would be obvious to one of ordinary skill in the art, the piping will contain many more valves and fittings not shown in FIG. 1.

The pump is of a size and capacity which is capable of handling relatively large solid particles of up to 5 cm in diameter. Use of a vortex or centrifugal pump is preferred, although pneumatically actuated diaphragm pumps and turbine pumps can be adapted for use in the system. The selection of suitable pumps will be apparent to one familiar with the art and is exemplified by the equipment described in Perry's Chemical Engineer's Handbook (5th Ed) pp. 6-5 through 6-14, the disclosure of which is herein incorporated by reference.

The tank 12 includes a side wall 26 which preferably is cylindrically shaped, a bottom wall 28 at one end of side wall 26 and a removable cover 30 at the other end of side wall 26 and coaxially aligned therewith. The cover 30 may be secured to the body portion of the tank 12 with an O-ring (not shown) disposed therebetween for a liquid tight seal and an outer sealing ring (not shown) circumferentially applied about the cover 30 and tightened to provide the seal with a nut and bolt (not shown). The cover 30 may be a spherical head as shown or may be generally dome shaped in the form of a frustum of a spherical segment, the top planar surface (not shown) of which may comprise a material which is transparent or translucent to light, e.g., glass, polycarbonate, polyvinyl chloride, polyetherimide, or the like, so that the interior of the tank 12 can be viewed. The side wall 26 and bottom wall 28 form the body portion of the tank 12. Side wall 26 contains an inlet/outlet port 32 in its lower portion and an inlet/outlet port 36 in its upper portion. The bottom wall 28 contains an inlet port 34. Sealing means (not shown) are provided to seal the ports 32, 34 and 36. The tank may be provided with a pressure gauge (not shown) having a manual air release valve (not shown) to measure the pressure differential across the filter medium within tank 12.

Inground PVC conduits are typically employed to transport the pool water to be filtered to and from the filtering system 10. A conduit 101 having one end in communication with the pool is connected at its other end to the pump inlet, for example, using a hose clamp. Another conduit 24 has one end thereof connected to the outlet of the pump, e.g., via a hose clamp (not shown) and is connected at its other end to an inlet/first port 42a of a 2-position slide valve 42. Conduit 18 has one end thereof connected to inlet/outlet or third port 42c of valve 42 and the other end connected to a first port of three-way valve 22. Conduit 44 has one end thereof connected to a nipple (not shown) extending through outlet port 36 of tank 12, the nipple forming the outer end of a hollow conduit arm 48 extending from filter unit 70 and a first manifold assembly 50. The other end of conduit 44 is connected to a second port of the threeway valve 22. The third port of valve 22 is connected via conduit 52 to the inlet port 34 on the tank bottom 28, the connection being made via a nipple (not shown) extending through inlet port 34 of tank 12, the nipple forming the outer end of a hollow conduit arm 54 extending from filter unit 70 and a second manifold assembly 62.

A fourth port 42d of valve 42 is connected to a conduit 20 which extends through the inlet/outlet port 32 into tank 12.

A second port 42b of valve 42 is connected to a filtered liquid return conduit 16 with a bypass valve 103, which transports the filtered water, for example, from the filter to the swimming pool (not shown). A fifth port 42e of valve 42 is connected to a waste conduit 8.

A valve handle 56 on the housing of valve 42 is slidable into two positions for diverting the pool water: (1) filter; and (2) backwash, as more fully described hereinafter. As an alternative to the 2-position slidable valve 42, multiport valves, for example 4 way rotatable valves, may be used. Four way multiport valve assemblies which are suitable for use in place of the slidable valve 42 in the filtering system of the present invention are known and include those described in U.S. Pat. No. 3,721,268 to Erlich et al.; U.S. Pat. No. 4,105,555 to Pease; or U.S. Pat. No. 4,328,833 to Aurther, the disclosures of which are incorporated herein by reference.

Centrally disposed within tank 12 is a filter unit 70 comprised of a plurality of generally rectangular filter elements 60. Located near the cover 30 of tank 12 is the first manifold assembly 50 which is comprised of a central manifold having a central hub 78 having a plurality of arms 64 extending therefrom. Each of the arms 64 has an inlet socket (not shown) and is adapted to receive a first end of a filter element 60.

In operation, the valve 42 is slid into the filter position permitting water from the pump to pass through the inlet conduit 24, into inlet port 42a of valve 42, conduit 20 and the inlet/outlet port 32 into the tank 12 and then through the plurality of filter elements 60, into arms 64 of the first manifold 50 and out of outlet port 36 of tank 12 through conduit arm 48, and through conduit 44, three-way valve 22, conduit 18, inlet/third port 42c and outlet/second port 42b of valve 42.

Initially, a slurry of DAE particles and pool water is introduced into the tank 12 to be deposited uniformly over the surfaces of the filter elements 60. This precoats the surfaces of the filter elements 60 with a layer of DAE particles. DAE, also known as diatomite, diatomaceous, silica, kieselguhr and infusorial earth is composed predominantly of the skeletal remains of microscopic single celled aquatic plants called diatoms. Physically, the diatom skeleton is an intricate structure having many submicron pores that occur, like snowflakes, in a large variety of shapes, no two being the same. DAE particles are typically sized between 10 to 200 micrometers (microns) in diameter and although they are as fine as cake flour in appearance, they have intricate and varied shapes. These irregular characteristics allow a free passage of water through a layer of DAE particles but filter out contaminants sized greater than about 1 micron.

After the DAE particles have coated the vertical filter elements 60, a precoat pressure is read using an inlet pressure gauge (not shown) located on tank 10 or the pump discharge. The filtering cycle begins as soon as the filter elements 60 have been precoated. As the layer of DAE particles separates contaminants from the pool water, the accumulation of contaminants, typically particulate and oily matter, progressively blocks water passage through the filtering DAE particles and ultimately requires regeneration thereof. Upon sufficient accumulation of such contaminants, the pressure within the tank 12 may increase to the limit of the pump discharge head used to force water through the filter elements 60. As a result, the flow of water through the filter elements 60 diminishes. The extent of contaminant accumulations may be readily measured by measuring the pressure drop across the filter elements 60 as the difference between the readings of the inlet pressure gauge (not shown) and an outlet pressure gauge (not shown) downstream of the filter elements. A large pressure drop signals that the filter elements 60 are not functioning effectively or that the pump being used to move the pool water is insufficient to effect movement against the pressure drop experienced against the filter unit 70 and in the tank 12.

For regeneration, the pump is stopped and the valve 42 is moved to the "backwash", position. The pump is then restarted and the flow of water, described previously in connection with the filter cycle, is reversed. In the present invention, water may be directed through the filter units via the first manifold or via the second manifold depending on the position of the 3-way valve 22. In one position of the 3-way valve 22, water from the pump is permitted to pass through the inlet conduit 24, inlet port 42a, outlet port 42c, conduit 18, three-way valve 22, conduit 44, outlet port 36, conduit arm 48, the first manifold 50 and through filter elements 60 into tank 12 and then out of tank 12 through inlet port 32 to conduit 20, through ports 42d and 42e to conduit 8. In another position of the 3-way valve 22, water from the pump is permitted to pass through conduit 24, inlet port 42a, outlet port 42c, conduit 18, three-way valve 22, conduit 52, inlet port 34, conduit arm 54, the second manifold 62 and through filter elements 60 into tank 12 and then out of tank 12 through inlet port 32 to conduit 20, through ports 42d and 42e to conduit 8.

In the backwash cycle, the pool water is directed in such a manner that accumulated contaminants coating the DAE layer are flushed free of the vertical filter elements 60. The flushed contaminants and DAE particles are directed to a waste conduit 8 which is coupled to exit port 42e of valve 42, for disposal beyond the pool. After thus "backwashing" the filter elements 60, the valve 42 is turned back to the "filter", position and fresh DAE particles are added to the tank to precoat the filter elements 60.

The backwashing operation is typically performed after every month or two of the filtering operation. However, as discussed earlier, the existing filter systems (i.e. the single manifold systems) suffer from poor backwashing efficiency with the result that at the end of each backwashing cycle some amount of particles and sludge remain on the filter elements. As a consequence, as time goes on, more frequent backwashing is needed with such systems until eventually backwashing does not yield a sufficiently clean filter element. At that point (typically one year from the start of the filter cycle), a "teardown", operation must be performed. During teardown, the filter unit 70 is removed from the tank 12 for manual cleaning of the filter elements 60. It is anticipated that the frequency of backwashing can be reduced and the filter cycle (time from one teardown to the next) can be prolonged with the use of the dual manifold system of the present invention.

A bypass valve 102 may be used for bypassing the filtering apparatus. Water will be pumped from the pool and go directly from the pump through the filter bypass valve. This permits power vacuuming of a very dirty pool or one that has been flocced so that the collected water can be discharged. It is further sometimes desired by pool owners to rinse the waste line until residual contamination therein has been flushed out, or, to have a forceful, albeit unfiltered, flow of water for therapy pools, or spas.

Figure 2:
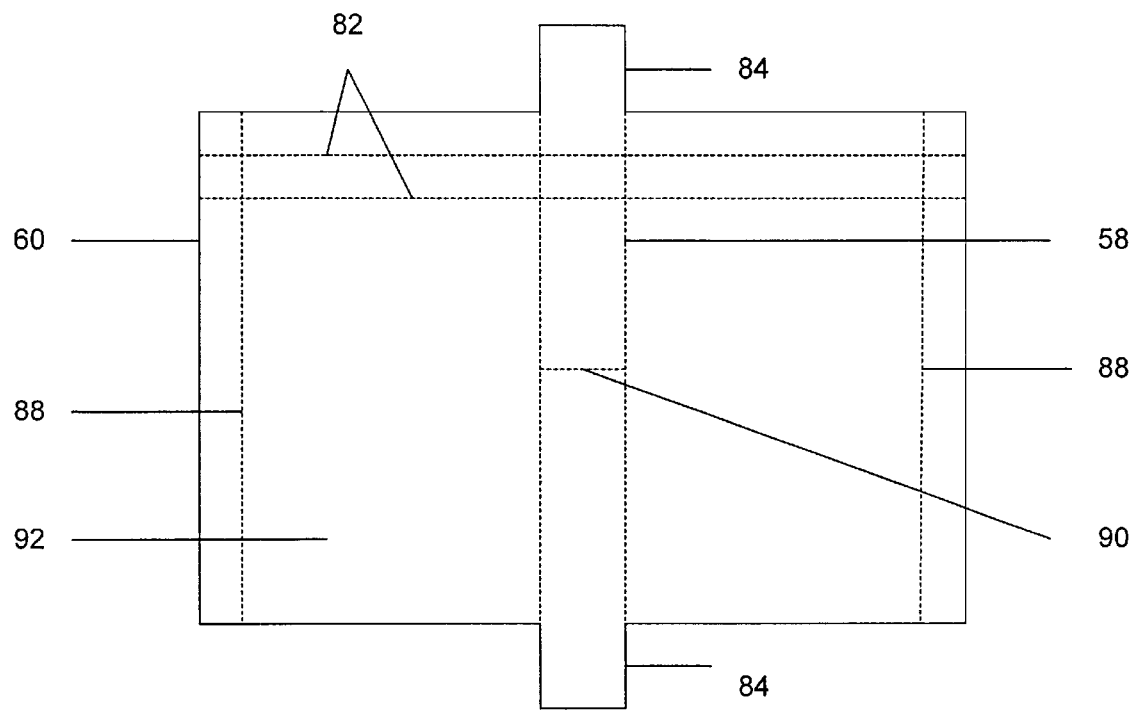
FIG. 2 is the elevation view of a curved filter element.
Figure 3:
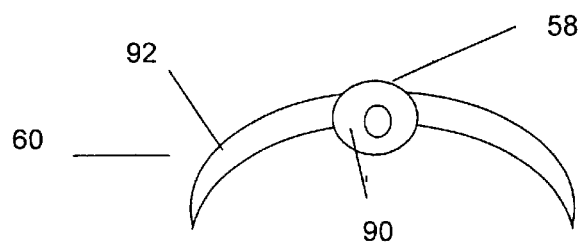
FIG. 3 is the plan view of a curved filter element, showing an orifice in the grid main channel.

The filter elements 60 are stacked in a spaced, planar relationship parallel to the axis of tank 12. The details of the filter element 60 are provided in FIGS. 2 and 3, which are the elevation and plan views, respectively, of a typical curved rectangular filter element (filter elements can be of many shapes other than curved rectangular, for example, flat rectangular, cuboid, cylindrical, etc.). As can be seen from FIG. 2, each filter element comprises a onepiece, skeletal grid, which, in turn, is comprised of a plurality of horizontal ribs 82 and/or vertical ribs 88 (FIG. 2 only shows 2 ribs of each type but typically more than two ribs are used) over which a woven septum 92 is stretched. The central internal part of each element is comprised of a backbone grid main channel 58 which connects with the first and second manifold assemblies on either side of the filter element, and which contains a flow restriction device 90 for restricting flow through the grid main channel during backwash operations. As shown in FIG. 3, a typical flow restriction device is a restriction orifice, 90.

The skeletal grid is preferably formed of a moldable synthetic plastic material such as polyethylene, polypropylene, polysulfone, polycarbonate, acrylonitrile-butadiene-styrene (ABS) or acrylonitrile-chlorinated polyethylene-styrene (ACS), acrylic-styrene-acrylonitrile (ASA) polymers, and the like. Suitable moldable plastic materials also are believed to include fluoroplastics (e.g., polytetrafluoroethylene), phenylene ether copolymers, polyamide-imide, polybutyleneterephthalate, polyetheretherketone, an acetal homopolymer, polyoxymethylene (commercially available from E.I. duPont de Nemours & Co., Washington, Del. 19898, under the trade name Delrin), acetal copolymers (commercially available from Celanese Engineering Resins, 86 Morris Ave., Summit, N.J. 07901, under the trade name Celcon) and epoxy-glass resins and the like.

It is understood that the system of the present invention is not limited to use with swimming pools but is equally applicable to other environments requiring a similar type filtering action.

The specific embodiments described above are intended to be representative and illustrative of the filtering system of the present invention which can be modified without departing from the spirit and scope of the invention.

What is claimed is:

1. A filter system comprising:

a chamber having a first end and a second end;

inlet hydraulic conduit means connected to the first end of said chamber for admitting liquid to be filtered;

a plurality of filter elements within said chamber, each of said filter elements having a first rod-shaped end and a second rod-shaped end projecting from said filter element;

a first structure which includes a first manifold near the first end of the chamber, said first manifold having a chamber connecting end that allows liquid to flow in or out of the first manifold, and an element connecting end with means to couple the first rod-shaped end of each of the filter elements to the first manifold;

a second structure which includes a second manifold near the second end of said chamber, said second manifold having a chamber connecting end that allows liquid to flow in or out of the second manifold, and an element connecting end with means to couple the second rod-shaped end of each of said filter elements to said second manifold;

a first hydraulic means having a first end coupled to the chamber connecting end of the first manifold for conducting liquid to and from the first manifold, and a second end connected to the chamber and extending externally therethrough;

a second hydraulic means having a first end coupled to the chamber connecting end of the second manifold for conducting liquid to and from the second manifold, and a second end connected to the chamber and extending externally therethrough;

means carried by said chamber for supporting the plurality of filter elements, said supporting means co-acting with the first and second hydraulic conduit means to maintain the filter elements in a fixed predetermined relation within the chamber and permitting ready removal of said elements from the chamber as a unit; and a flow control device located between the first rod-shaped end and the second rod-shaped end of each of the plurality of filter elements.

2. The filter system of claim 1 wherein the flow control device is a restriction orifice.

3. A filter system for filtering a liquid into a filtered liquid, the filter system comprising:

a. a tank having a fixed body and a removable cover, said body having an inlet port, a first manifold port and a second manifold connecting port;

b. a removable filter assembly disposed within said tank, said filter assembly comprised of a first manifold, a second manifold, and a plurality of like, curved filter elements, each of said filter elements being comprised of a backbone grid main channel open at a first end and a second end, ribs attached to said backbone grid main channel and extending outwardly therefrom to form a substantially rigid skeletal grid, a woven septum stretched over the entire surface of the skeletal grid, said backbone grid main channel extending substantially through the length of the woven septum with its first and second ends projecting therethrough, and said ribs and the backbone grid main channel connected together in such a way that the filtered liquid flows from the direction of the ribs into the backbone grid main channel and out through one of either the first or the second end of the backbone channel, wherein the backbone grid main channel contains a flow control device, said first manifold including a central hub having a plurality of element connecting ends extending outwards from the central hub and with means to couple the first end of the backbone grid main channel of each of the filter elements to the first manifold, and a conduit arm in fluid communication with the first manifold port in said body, said second manifold including a central hub having a plurality of element connecting ends extending outwards from the central hub and with means to couple the second end of the backbone grid main channel of each of the filter elements to the second manifold, and a conduit arm in fluid communication with the second manifold port in said body, said filter assembly being disposed in a flow path of the liquid passing into and out of said tank;

c. a pump means in fluid communication with an inlet line for the liquid to be filtered, with said ports in said tank, and with return and waste lines, said pump means being capable of causing said liquid to flow into and out of said ports in said tank, through said filter elements, and the first and second manifolds and out through said return or waste lines and further being capable of causing said liquid to by-pass said tank and flow out of said return or waste lines; and d. a multifunctional valve means in fluid communication with said pump means, with said ports in said tank, and with said return and waste lines and having:
   a first control means having open and closed states and capable of controlling the flow of said liquid into said inlet port through said filter elements and said first manifold and said first manifold port, and out through said return line;
   a second control means having open and closed states and capable of controlling the flow of said liquid into said first manifold port, through said first manifold and filter elements and through said inlet port, and out through said waste line;
   a third control means having open and closed states and capable of controlling the flow of said liquid into said second manifold port, through said second manifold and filter elements and through said inlet port, and out through said waste line;
   a fourth control means having open and a closed states and capable of controlling the flow of said liquid by-passing said tank out of said return line;
   a fifth control means having open and closed states and capable of controlling the flow of said liquid by-passing said tank out of said waste line; and
   means for moving each of said first, second, third, fourth and fifth control means between their respective open and closed states.

4. The filter system of claim 3 wherein the flow control device is a restriction orifice.

5. The filter system of claim 3 wherein the backbone grid main channel is comprised of a plurality of conduits.

6. A filter system for filtering a liquid into a filtered liquid, the filter system comprising:
   a. a tank having a fixed body and a removable cover, said body having an inlet port, a first manifold port and a second manifold connecting port;
   b. a removable filter assembly disposed within said tank, said filter assembly comprised of a first manifold, a second manifold, and a plurality of like, curved filter elements,
      each of said filter elements being comprised of a backbone grid main channel open at a first end and a second end, ribs attached to said backbone grid main channel and extending outwardly therefrom to form a substantially rigid skeletal grid, a woven septum stretched over the entire surface of the skeletal grid, said backbone grid main channel extending substantially through the length of the woven septum with its first and second ends projecting therethrough, and said ribs and the backbone grid main channel connected together in such a way that the filtered liquid flows from the direction of the ribs into the backbone grid main channel and out through one of either the first or the second end of the backbone channel,
      said first manifold including a central hub having a plurality of element connecting ends extending outwards from the central hub and with means to couple the first end of the backbone grid main channel of each of the filter elements to the first manifold, and a conduit arm in fluid communication with the first manifold port in said body,
      said second manifold including a central hub having a plurality of element connecting ends extending outwards from the central hub and with means to couple the second end of the backbone grid main channel of each of the filter elements to the second manifold, and a conduit arm in fluid communication with the second manifold port in said body,
      said filter assembly being disposed in a flow path of the liquid passing into and out of said tank;
   d. an inlet conduit for the liquid to be filtered;
   e. a filtered liquid return conduit;
   f. a backwash waste conduit;
   g. a pump means in fluid communication with the inlet conduit for the liquid to be filtered, with said inlet port and manifold ports in said tank, and with the filtered liquid return conduit and the backwash waste conduit, said pump means being capable of causing said liquid to flow into and out of said inlet and manifold ports in said tank, through said filter elements, and the first and second manifolds and out through said filtered liquid return conduit and the backwash waste conduit; and
   h. a valve and pipe means in fluid communication with said pump means, with said inlet port and manifold ports in said tank, and having:
      a two-position slide valve that can be slid into a filter position or a backwash position, a first port of said slide valve being connected to the inlet conduit for the liquid to be filtered, a second port of said slide valve being connected to the filtered liquid return conduit, and a third port of said slide valve being connected to the backwash waste conduit;
      a first conduit connecting a fourth port of said slide valve to the inlet port of the tank;
      a three-way valve;
      a second conduit connecting the first manifold port of the tank to a second port of the three-way valve;
      a third conduit connecting the second manifold port of the tank to a third port of the three-way valve; and
      a fourth conduit connecting a first port of the three-way valve to a fifth port of said slide valve.

7. The filter system of claim 6 wherein the backbone grid main channel contains a flow control device.

8. The filter system of claim 7 wherein the flow control device is a restriction orifice.

9. The filter system of claim 6 wherein the backbone grid main channel is comprised of a plurality of conduits.

* * * * *